Sept. 27, 1960 J. O. HRUBY, JR 2,954,171
LAWN SPRINKLER
Filed June 20, 1958 2 Sheets-Sheet 1
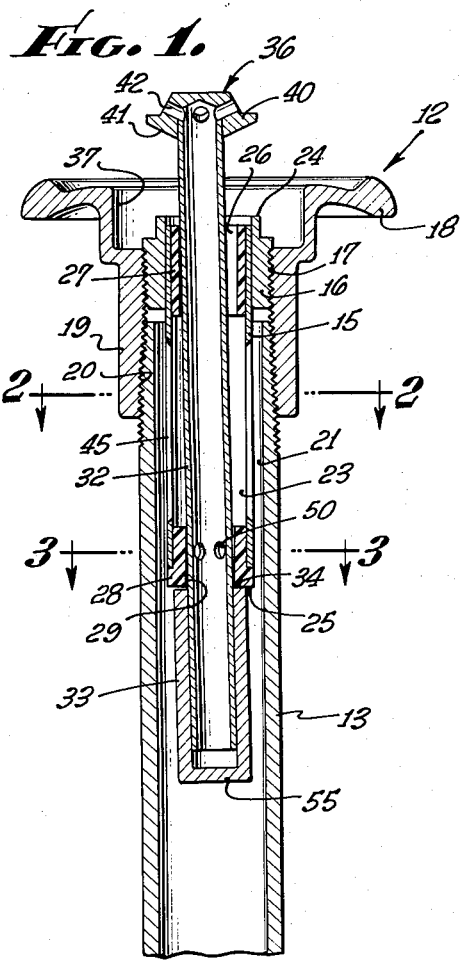
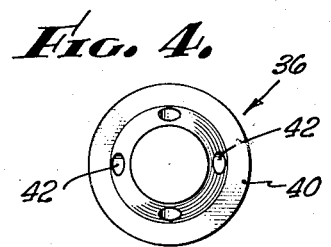
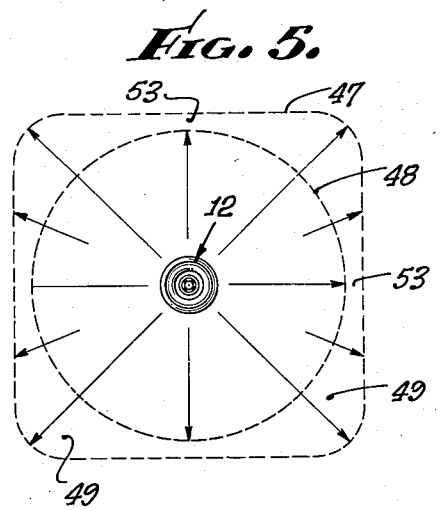
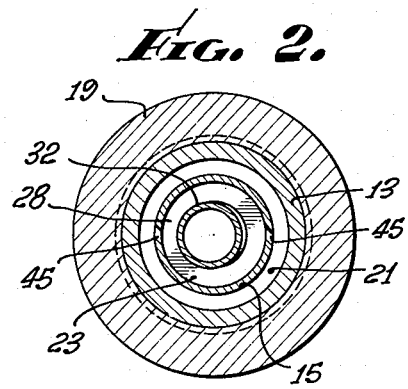
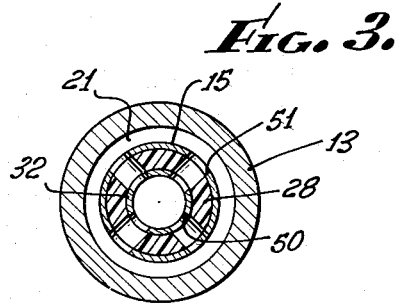
JOHN O. HRUBY, JR.
INVENTOR
BY Huebner & Worrel
ATTORNEYS.

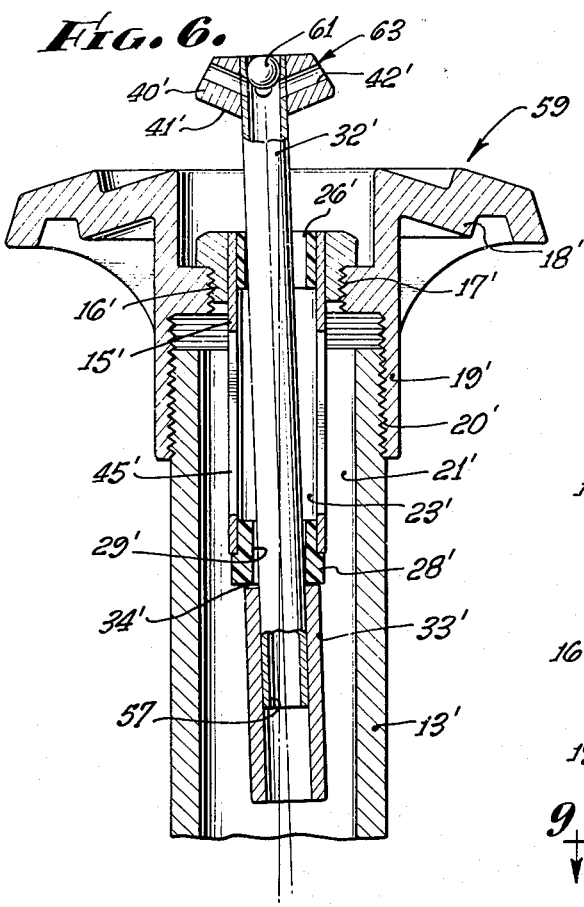
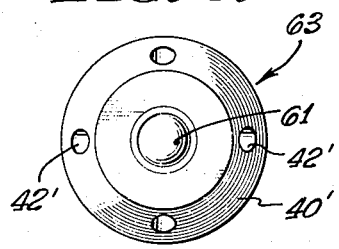
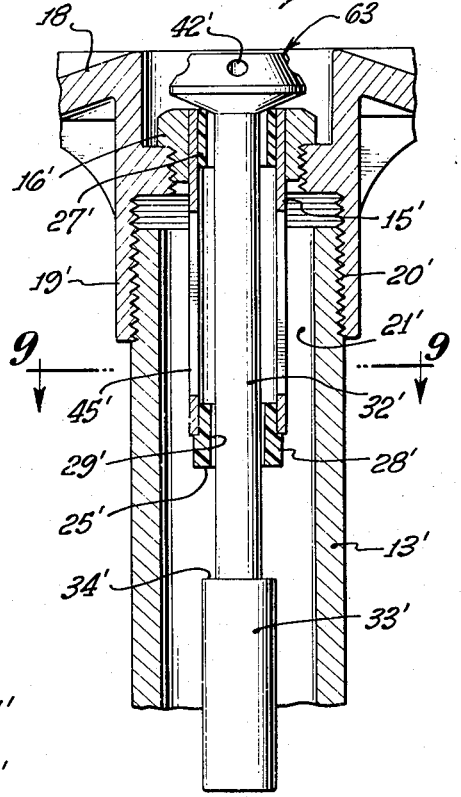
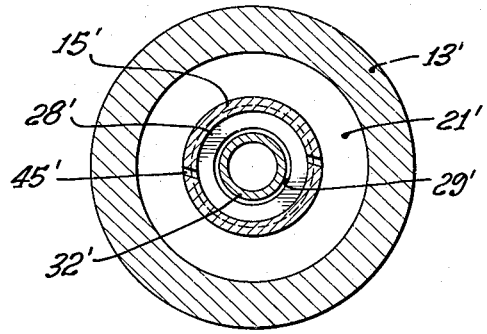

United States Patent Office

2,954,171
Patented Sept. 27, 1960

2,954,171

LAWN SPRINKLER

John O. Hruby, Jr., Burbank, Calif., assignor, by mesne assignments, to Rain Jet Corporation, Los Angeles, Calif., a corporation Filed June 20, 1958, Ser. No. 743,418

4 Claims. (Cl. 239—231)

This invention relates to fluid discharging devices and relates more particularly to lawn sprinklers of the character illustrated and described in Letters Patent of the United States, Nos. 2,589,942 and 2,639,191, issued to me on March 18, 1952, and May 19, 1953, respectively. The instant application is a continuation-in-part of my copending application, Serial No. 637,670, now abandoned, filed February 1, 1957.

Sprinklers of the general type disclosed in said patents are characterized by a solid stem or a tubular stem disposed longitudinally in a sprinkler body and adapted to gyrate in the body with the axis of the stem being inclined with respect to the axis of the body. Such stems are pivoted in the body along a transverse plane or cylindrical area between the ends of the stem whereby the path traced by the stem in being gyrated around in the sprinkler body is that of a three-dimensional graph known as a "hyperboloid of one sheet." In being so gyrated the stem is caused to roll along a surface at which it is pivoted thus imparting rotation to the stem on its axis.

In the case of the water discharging device of said Patent No. 2,589,942, having a solid stem, there is a head upon the outer end of the stem which serves to deflect water from the body in a direction radially outwardly from the stem, the inclination of the stem while being gyrated around in the body causing the head to deflect water from the body instantaneously upwardly from one side of the head and relatively downwardly in an opposite direction from the other side of the head, thereby to evenly distribute the water over a wide area around the device.

In the lawn sprinkler disclosed in said Patent No. 2,639,191 the stem is tubular and has outlet orifices formed around the outer end portion thereof below a cap on the upper end of the stem. Gyration of the stem on an inclined axis and rotation of the stem on its long axis causes streams of water from the orifices to revolve around the sprinkler and to move outwardly toward the periphery of the area being sprayed and then inwardly from the periphery thereby to distribute water evenly over the lawn area. Also in the case of such sprinklers, water discharged from the body around the stem is deflected radially outwardly by the cap and is intersected by the streams of water from the orifices to distribute water over a relatively narrow annular area immediately around the sprinkler.

The underlying concept of the instant invention is that sprinklers of the above mentioned character may be improved to obtain spray patterns of predetermined configuration by increasing the flow of water in the sprinkler body around the stem (i.e. motor water for gyrating the stem) and adapting the stem orifices to fill in a peripheral area of the spray pattern. Stated otherwise, the instant invention employs the concepts of said Patent No. 2,589,942 for distributing the greater part of the water spray over a large circular area around the sprinkler, and utilizing the stem orifices to cover the peripheral areas of the spray pattern.

It is a general object of this invention to provide a rotary sprinkler which may be adapted to produce a spray pattern of evenly distributed water droplets over an area of predetermined configuration, e.g. circle, ellipse, rectangle, square, triangle, and others.

Further objects and advantages of the invention will appear during the course of the following part of this specification wherein the details of construction and mode of operation of two preferred embodiments are described with reference to the accompanying drawing, in which:

Fig. 1 is a central vertical section through a sprinkler embodying the invention;

Figs. 2 and 3 are cross sections taken on lines 2—2 and 3—3, respectively, of Fig. 1;

Fig. 4 is an enlarged plan view of the stem cap of the sprinkler;

Fig. 5 is a diagrammatic view illustrating a spray pattern obtained with the sprinkler of Fig. 1;

Fig. 6 is a central vertical section through a second form of sprinkler embodying this invention, the same being adapted for producing a circular spray pattern and being shown with the stem thereof in its water discharging position;

Fig. 7 is a central vertical section through the sprinkler of Fig. 6 showing the sprinkler stem in its rest position when no water is flowing through the sprinkler;

Fig. 8 is an enlarged plan view of the cap of the sprinkler of Fig. 6; and

Fig. 9 is a cross section through the sprinkler taken on line 9—9 of Fig. 7.

Referring to the drawing in greater detail, and in particular to Figs. 1–5 inclusive thereof, there is shown a sprinkler embodying the invention, designated generally by reference numeral 12, the same being designed to produce a spray pattern which for practical purposes is square. The sprinkler is mounted atop a riser pipe 13 which in turn is connected at its lower end to a supply pipe (not shown) of a sprinkler system.

Sprinkler 12 comprises a hollow body 15 having a tubular nut 16 around the upper end of the body, the body being force-fitted or otherwise suitably secured in the nut. The nut is screw-threaded at 17 for securing the same in a casting 18. The casting has a skirt portion 19 which is internally screw-threaded at 20 for mounting the sprinkler on the upper end of the riser. The nut 16 and the casting 18 serve to mount the sprinkler body axially within the riser and to close the upper end of the riser around the body. The body is of smaller outside diameter than the inside diameter of the riser to provide an annular space 21 around the body.

The inside cavity of the hollow body 15 is designated by numeral 23. The body is preferably tubular and its cavity may be formed as an axial bore of circular cross section. An annular end face 24 defines the upper or outer end of the body while the lower or inner end of the body is defined by an annular end face 25. A water discharge opening 26 in the outer end of the body is defined by a sleeve 27 which is force-fitted in the upper end of bore 23. A bearing sleeve 28 is force-fitted in the lower end of bore 23, it having a cylindrical bore 29 extending axially therethrough, and the lower end face of the sleeve 28 being the lower end face 25 of the body.

Arranged longitudinally in the cavity or bore of the body is a tubular stem 32 which extends outwardly of the discharge opening 26 and through the bore 29 of the lower bearing sleeve. The stem is substantially smaller in its outside diameter than the bore of the upper bearing sleeve while the bore 29 of the lower bearing sleeve is only slightly larger in diameter than the stem, enough so that the lower sleeve will accommodate rotation of the stem on its axis and will accommodate sufficient inclination of the stem with respect to the axis of the body cavity to permit the stem to touch the upper end of the inside walls which define the bore of the upper sleeve 27.

The stem is movable longitudinally in the body cavity and is moved upwardly to the position thereof shown in Fig. 1 by the force of water flowing through the sprinkler. Secured on the lower end portion of the stem is a collar 33, the upper end of which provides an upwardly facing annular shoulder 34 which serves as a stop by engagement with the lower end face 25 of the body to limit upward movement of the stem in the body.

There is a head 36 upon the upper end of the stem, the head being larger in diameter than the discharge opening 26 whereby when water to the sprinkler is turned off, the stem will drop down in the body to a position in which the head closes the discharge opening 26. A recess 37 is formed in the casting 18 to accommodate the stem head when the water supply is turned off thereby to protect the head when in stand-by condition from damage by traffic over the lawn.

The stem head has an annular collar portion 40, providing a frusto-conical under side 41 extending radially outwardly and slightly upwardly from the stem for deflecting water from the discharge opening of the body. Thus, the column of water passing upwardly from the body out through the discharge opening 26 will be deflected by the underside of the collar radially outwardly from the stem and slightly upwardly. The upper end portion of the stem has a plurality of orifices 42 which are formed in the head above the underside 40, there being four such orifices in the embodiment shown in Fig. 1. Water passes upwardly in the stem and out through the orifices 42 in streams extending radially outwardly and slightly upwardly from the sprinkler.

There is a plurality of apertures 45 formed in the side walls of the body for admitting water from the riser into the body cavity. These apertures are preferably formed as narrow slits which extend longitudinally of the sprinkler body, there being two such slits in each of the illustrated embodiments. As best shown in Figs. 2 and 9, these slits extend through the body side wall at an angle with respect to the radii of the body cavity thus causing the water in the body cavity to spiral or rotate around and upwardly in the body cavity and out through the discharge opening 26. The swirl of water in the body cavity resulting from the slant of the slits 45 causes the stem to revolve or gyrate within the body cavity with the axis of the stem being inclined with respect to the axis of the body cavity as appears in Fig. 1 of the drawing. Thus the stem contacts each of the sleeves 27 and 28 and rolls within and around an annular inside rim or edge of the sleeves whereby the stem is caused to rotate on its axis. The sleeves 27 and 28 are preferably formed of laminated phenolic composition to increase the life of the sprinkler for sleeves of such composition are wear resistant.

It is an important feature of the sprinklers of this invention that there be a relatively large amount of water flowing through the slits 45 and out through the discharge opening of the body to cover a large circular area which closely approaches, and in some cases may be coincident with, the outside perimeter of the area being sprayed. The streams of water emitted from the stem through orifices 42 are relied upon to cover the area beyond the circular area covered by water from the body discharge opening.

The sprinkler 12 of Figs. 1 to 5 inclusive is designed to produce a square spray pattern, the perimeter of which is designated by reference numeral 47. Water from the body discharge opening being deflected by the underside of head 36 covers a circular area, the circumference of which is designated by numeral 48. The corner areas of the spray pattern are designated by numeral 49. Water enters the stem 32 through inlet openings or ports 50 formed in the lower end portion of the stem, there being corresponding openings or ports 51 in the lower end portion of the body at a position such that when the stem is disposed upwardly in the body cavity, the stem ports 50 will become aligned or in registry with the body ports 51, respectively, during a predetermined phase in the period of rotation of the stem on its long axis.

The ports 50 are four in number and are uniformly spaced apart in a circumferentially arranged series around the stem. The body ports 51 are also four in number and are uniformly spaced apart around the body to extend through the lower bearing sleeve 28. Althought the pairs of ports 51 are four in number, it is not necessary that there be that number even in the case where the sprinkler is designed to produce a square spray pattern. The square pattern results from increased flow of water in the riser during that period in the rotation of the stem when the stem orifices 42 are pointed in the direction of the corners of the square. There may be but one pair of ports 50 and 51 and four orifices 42 to produce a square pattern. Also there may be but one orifice 42 and one port 50 with four body ports 51 to produce a square pattern. What is important is that a stem port 50 become aligned with a body port 51 when an orifice 42 is directed toward a corner of the square pattern to cover a corner area 49.

From the above it will be apparent that sprinklers of this invention may be adapted to cover any desired area. For a non-circular area of predetermined outline the sprinkler should be designed so that water will flow upwardly in the stem during that phase in the period of rotation of the stem when a stem orifice 42 is directed toward an area extending beyond the circumference of the circular area to be covered by water from the body discharge opening. In the case of a triangular spray pattern, for example, the flow of water through the stem will be increased through alignment of the stem ports 50 and the body ports 51 when an orifice 42 is directed toward a corner of the triangular.

In the square pattern illustrated in Fig. 5 there are narrow areas 53 beyond the circumference 48 and contiguous the midpoints of the sides of the square area. These narrow areas 53 result from water flowing upwardly in the cyclindrical bore of bearing sleeve 28 and through the stem ports 50 when the stem ports 50 are out of phase with respect to the body ports 51. It will be understood, of course, that the ports 50 and 51 may be of any desired configuration, e.g. diamond shaped, narrow slits, etc., to adapt the sprinkler to spray out to any irregular areas beyond the circle 48.

To obtain greater flow of fluid through the body cavity than through the stem at least during those phases in the period of rotation of the stem when the stem orifices 42 are directed to areas extending beyond circle 48, the slits 45 and the body discharge opening 26 are made to sufficient size that they will accommodate greater volume flow than that of the secondary passage or flow through the stem.

In the embodiment of Figs. 1–5 inclusive, the lower end of the stem is closed as by forming the collar 33 as a cup to provide a bottom wall 55, whereby the inlet for the stem is constituted solely of the ports 50.

In the embodiment shown in Figs. 6 to 9, inclusive, an inlet opening or port 57 of the stem is located at the lower end whereby the stem receives water at all times from the riser to produce a circular spray pattern. The sprinkler of Figs. 6–9 is designated generally by reference numeral 59 and the component parts thereof which correspond with respective parts of the sprinkler 12 of Figs. 1–6 are designated by the same reference numerals as are used to designate the respective parts of the sprinkler 12, there being a prime (′) added to each of the numerals used for the parts of the sprinkler 59. Thus, for example, the casting of sprinkler 59 is designated by numeral 18′ inasmuch as it corresponds in function with the casting 18 of the sprinkler 12; the stem of sprinkler 59 is designated by reference numeral 32′ as it corresponds with the stem 32 of sprinkler 12; etc.

In the sprinkler 59 the stem head 63 comprises a ball 61 which closes the upper end of the stem, the lower end portion of the ball providing inclined surfaces for directing water in the stem out through the orifices 42' thereof.

It will be noted that inasmuch as the stem inlet port 57 of sprinkler 59 is located in the lower end of the stem, there is no need for any ports 51 in the sprinkler body as are present in the sprinkler 12.

The openings provided by the slits 45' of sprinkler 59 are larger than the total of the cross-sectional areas of the orifices 42', and the discharge opening 26' around the stem 32' is greater than the total cross-sectional area of the orifices 42 whereby a larger volume of water will flow through the body cavity than through the orifices 42.

While the instant invention has been shown and described herein, in what are conceived to be the most practical and preferred embodiments, it is recognized that departures may be made therefrom within the scope of the invention, which is therefore not to be limited to the details disclosed herein, but is to be accorded the full scope of the claims.

What I claim is:

1. A fluid discharging device comprising a body adapted to be mounted upon a fluid supply conduit and having a side wall and an outer end and an internal wall defining a cavity within the body and defining a fluid discharge opening in said outer end, a tubular stem arranged longitudinally in the body cavity and of smaller diameter than the body cavity to leave a passage in the cavity around the stem, the stem having an inner end and an outer end, means closing the inner end of the stem against reception of fluid, the outer end of the stem projecting outwardly from said discharge opening, the projecting portion of the stem having at least one orifice formed therein for discharge of fluid from the stem, a circumferentially extending collar on said projecting portion of the stem for deflecting fluid from said discharge opening radially outwardly around the device, bearing means for the stem at a point spaced inwardly from the outer end of the body permitting rotation of the stem about its longitudinal axis and pivotal movement of the stem with respect to said point while inclined with respect to the axis of said cavity, the body having slant openings formed in the side wall thereof for flow of fluid from said conduit to the body cavity thus to impart rotary motion to fluid in said cavity so as to gyrate the stem in the cavity and cause rotation of the stem on its longitudinal axis, the side wall of the body having at least one inlet port formed therein proximate said point, the stem having an inlet port formed therein at a position where it will become aligned or in registry with said body port during a predetermined phase in the period of rotation of the stem on its axis, whereby fluid enters the stem for discharge through said stem orifice during said phase.

2. A lawn sprinkler comprising a hollow body having a side wall and an upper end and an inside wall defining a cavity in the body and defining a water discharge opening in said upper end, a tubular stem having a cylindrical side wall and arranged longitudinally in the body cavity and of smaller diameter than the discharge opening to leave a passage around the stem, the stem having a lower end portion and an upper end portion, the stem having a circumferentially arranged series of inlet openings formed in the lower end portion thereof and disposed in the side wall of the stem for reception of water, the upper end portion of the stem projecting outwardly from said discharge opening, the stem having at least one orifice formed in the upper end portion thereof for the discharge of water from the stem, bearing means for the stem at a point spaced inwardly from the upper end of the body permitting rotation of the stem about its long axis and pivotal movement of the stem with respect to said point while inclined with respect to the axis of the cavity, the body having slant openings formed in the side wall thereof for flow of water from outside the body to the body cavity thus to impart rotary motion to fluid in the cavity so as to gyrate the stem in the body and to cause rotation of the stem on its axis, a circumferentially extending collar on the upper end portion of the stem, the collar having a frusto-conical surface extending radially outwardly from the stem and facing in a direction toward the discharge opening whereby water flowing around the stem from the cavity and out through the discharge opening will be deflected by said collar surface radially outwardly from the stem, the passageway for flow through the body provided by the body openings being of greater capacity than that of the passageway through the stem provided by the stem openings, the body having a circumferentially arranged series of ports formed therein, said inlet openings of the stem becoming aligned with respective body ports during a predetermined phase in the period of rotation of the stem, and the lower end of the stem being closed.

3. A fluid discharge device comprising a body adapted to be mounted on a fluid supply conduit and having an outer end and an inner end and an internal wall defining a cavity formed therein, the body having an outer end opening formed therein for discharge of fluid from the cavity and an inner end opening in communication with the cavity, a tubular stem arranged longitudinally in the cavity and extending outwardly beyond said discharge opening and inwardly beyond said inner end opening, stop means on the body facing in a direction inwardly from said discharge opening, stop means on the stem abuttable against the body stop means for preventing removal of the stem out through the discharge opening, the stem being rotatable on its long axis and gyratable around in the cavity with the long axis of the stem being inclined with respect to the axis of the cavity, a circumferentially extending collar on the outer end portion of the stem, the collar having a surface extending radially outwardly from the stem and facing in a direction toward the discharge opening whereby water flowing around the stem from the cavity and out through the discharge opening will be deflected by said collar surface radially outwardly from the stem, the stem having an outlet orifice formed in the outer end portion thereof outwardly beyond said collar surface for emitting a stream of fluid radially outwardly from the stem, the body having an inlet opening formed in the side wall thereof for flow of fluid from said conduit into the body cavity, the inlet opening of the body being inclined with respect to the radius of the body to impart rotary motion to fluid within the body thereby to gyrate the stem within the body, the body having a port formed therein and disposed axially inwardly of said body inlet opening, the stem having an inlet opening formed in the inner end portion thereof and disposed in the side wall of the stem at a point where it will become aligned or in registry with the body port when the stop means on the stem is engaged with the stop means on the body, whereby fluid will flow from said conduit and through said inlet opening of the stem during a predetermined phase in the period of rotation of the stem.

4. A fluid discharge device according to claim 3 in which the stem has a circumferentially arranged series of inlet openings formed therein, and the body has a circumferentially arranged series of ports formed therein, said inlet openings becoming aligned with the ports respectively during said predetermined phase.

References Cited in the file of this patent

UNITED STATES PATENTS

| | | |
|---|---|---|
| 2,255,688 | Tavone | Sept. 9, 1941 |
| 2,589,942 | Hruby | Mar. 18, 1952 |
| 2,639,191 | Hruby | May 19, 1953 |
| 2,739,839 | Greener et al. | Mar. 27, 1956 |
| 2,823,952 | Hruby | Feb. 18, 1958 |